(12) United States Patent
Tutureski

(10) Patent No.: US 12,313,028 B2
(45) Date of Patent: May 27, 2025

(54) HYDROSTATIC PRESSURE TO KINETIC ENERGY CONVERSION SYSTEM

(71) Applicant: Simon Tutureski, Lane Cove (AU)

(72) Inventor: Simon Tutureski, Lane Cove (AU)

( * ) Notice: Subject to any disclaimer, the term of this patent is extended or adjusted under 35 U.S.C. 154(b) by 44 days.

(21) Appl. No.: 18/251,305

(22) PCT Filed: Nov. 5, 2021

(86) PCT No.: PCT/AU2021/051315
§ 371 (c)(1),
(2) Date: May 1, 2023

(87) PCT Pub. No.: WO2022/094673
PCT Pub. Date: May 12, 2022

(65) Prior Publication Data
US 2024/0011458 A1    Jan. 11, 2024

(30) Foreign Application Priority Data

Nov. 9, 2020 (AU) ................................ 2020904076

(51) Int. Cl.
*F03C 7/00* (2010.01)
*F01B 9/04* (2006.01)
(Continued)

(52) U.S. Cl.
CPC ................. *F03C 7/00* (2013.01); *F01B 9/047* (2013.01); *F01B 19/04* (2013.01); *F01B 23/10* (2013.01); *F03C 1/03* (2013.01); *F16J 15/52* (2013.01)

(58) Field of Classification Search
CPC .......... F01B 9/047; F01B 19/04; F01B 23/10; F03C 1/03; F03C 7/00; F16J 15/52
(Continued)

(56) References Cited

U.S. PATENT DOCUMENTS 4,036,112 A * 7/1977 Hubschmann ........... F16J 15/52
                                                              92/80
4,378,935 A * 4/1983 Brown ................... F16F 9/0454
                                                             403/291
(Continued)

FOREIGN PATENT DOCUMENTS

CH         713181 A2    5/2018
CN     111022125 A *    4/2020    .............. F01B 9/047
(Continued)

OTHER PUBLICATIONS

DE102011001210A1_t machine translation thereof (Year: 2012).*
(Continued)

*Primary Examiner* — Matthew Wiblin
(74) *Attorney, Agent, or Firm* — INNOVATION CAPITAL LAW GROUP, LLP; Vic Lin

(57) ABSTRACT

A hydrostatic pressure to kinetic energy conversion system comprises a hydraulic head water column having a lower end which diverges to a pair of pressure channels. A valve system interfaces the water column and the pressure channels so that hydrostatic pressure from the water column alternately pressurises each channel. The system further comprises racks forced by pistons to act oppositely to rotate a driveshaft therebetween. Furling bladders within the channels forcibly unfurl under pressure to force the pistons. Proximal ends of the pistons may comprise sufficiently small diameter for envelopment by the furling bladders.

23 Claims, 4 Drawing Sheets

(51) Int. Cl.
*F01B 19/04* (2006.01)
*F01B 23/10* (2006.01)
*F03C 1/03* (2006.01)
*F16J 15/52* (2006.01)

(58) Field of Classification Search
USPC .......................................................... 60/398
See application file for complete search history.

(56) References Cited

U.S. PATENT DOCUMENTS

| | | | | |
|---|---|---|---|---|
| 4,472,937 | A | * | 9/1984 | Isamu .................. F03B 17/025 60/507 |
| 4,838,025 | A | * | 6/1989 | Nelis ..................... F03B 17/025 60/507 |
| 5,138,936 | A | * | 8/1992 | Kent ....................... F01B 19/00 92/103 F |
| 5,325,667 | A | * | 7/1994 | Lundback ............. F04B 43/082 91/328 |
| 5,765,375 | A | | 6/1998 | Lundback |
| 6,933,624 | B2 | * | 8/2005 | Beaston ................ F03B 17/025 290/43 |
| 8,294,292 | B2 | * | 10/2012 | Irwin ...................... F03B 13/00 290/43 |
| 2003/0185688 | A1 | | 10/2003 | Han |
| 2005/0073154 | A1 | | 4/2005 | Dudley |
| 2015/0192017 | A1 | | 7/2015 | Morales |
| 2020/0041011 | A1 | | 2/2020 | Melhus |

FOREIGN PATENT DOCUMENTS

| | | |
|---|---|---|
| DE | 102011001210 A1 | 9/2012 |
| GB | 2334763 A | 9/1999 |
| GB | 2553662 A | 3/2018 |
| WO | 2017034552 A1 | 3/2017 |

OTHER PUBLICATIONS

CN111022125A_t machine translation thereof (Year: 2020).*
International Search Report & Written Opinion dated Feb. 3, 2022 from PCT Application No. PCT/AU2021/051315.

* cited by examiner

HYDROSTATIC PRESSURE TO KINETIC ENERGY CONVERSION SYSTEM

FIELD OF THE INVENTION

This invention relates generally to water engines.

BACKGROUND

A water engine is a positive-displacement engine, often closely resembling a steam engine and with similar pistons and valves, that is driven by water pressure.

The supply of water may be derived from a natural head of water, specialised high-pressure water supply or the like and typically operate on water pressures from 30 up to 800 psi.

One such water engine is disclosed by GB 2334763 A (Bobby Premarajan Amarasingam et al.) 1 Sep. 1999 and which is powered by a head of water and which comprises a pair of pistons and controlled valves to alternately rock a seesaw which in in turn reciprocates a piston acting on a flywheel.

However, a need exists to improve the conversion efficiency of hydrostatic pressure to kinetic energy conversion.

SUMMARY OF THE DISCLOSURE

There is described herein a hydrostatic pressure to kinetic energy conversion system comprising a hydraulic head water column wherein a lower end of the water column diverges to a pair of pressure channels.

A valve system interfaces the water column and the pressure channels so that hydrostatic pressure from the water column alternately pressurises each channel.

The system further comprises pistons and racks forced by the pistons to act oppositely to rotate a driveshaft therebetween.

Furling bladders within the channels forcibly unfurl under pressure to force the pistons.

Proximal ends of the pistons may comprise sufficiently small diameter for envelopment by the furling bladders.

The furling bladders efficiently convert hydrostatic pressure to kinetic energy and the pressure channel and furling bladder arrangement allow for relatively long piston travel distance as compared to shorter stroke rocker-type water engines.

Furthermore, the pressure channel and furling bladder arrangement does not rely on momentum like flywheel-type water engines.

Furthermore, the racks acting oppositely on the driveshaft provide constant torque along the full piston travel length and furthermore allow for multiple driveshaft revolutions for each stroke.

Each channel may comprise a similar cross section as the water column so that the full extent of hydrostatic pressure is borne by each channel for conversion to kinetic energy.

The racks may be coupled to return one piston as the other is extended. The coupling may comprise respective pinions acting oppositely on the driveshaft.

The coupling may convert alternating rotation of the driveshaft to unidirectional rotation better suited for driving generators.

Return risers may return water from the channels to the water column. The return risers may be pump assisted. Water draining from the pressure channels may collect in a reservoir for off-peak return pumping to the water column.

Each channel may comprise a control valve having a butterfly disc pivoting between open and close positions which is controlled by an actuator comprising a hydraulically operated control piston having a distal end which extends to entrap the disc in a closed position.

The channel may further comprise a nonreturn valve.

The system may further comprise a piston pump siphon to prime each channel in anticipation of a stroke by reducing pressure between the control valve and the nonreturn valve to assist closing of the nonreturn valve.

The system can be scaled according to required power capacity and installed as a decentralised power supply for internal or distributed power in buildings. The water column has a small footprint and can be installed from basement to roof level in all buildings adjoining the lift/stair core walls. Multiple units can be installed and operated independently, suits maintenance and disruption issues.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

A hydrostatic pressure to kinetic energy conversion system comprises a hydraulic head water column 1.

Figure 1:
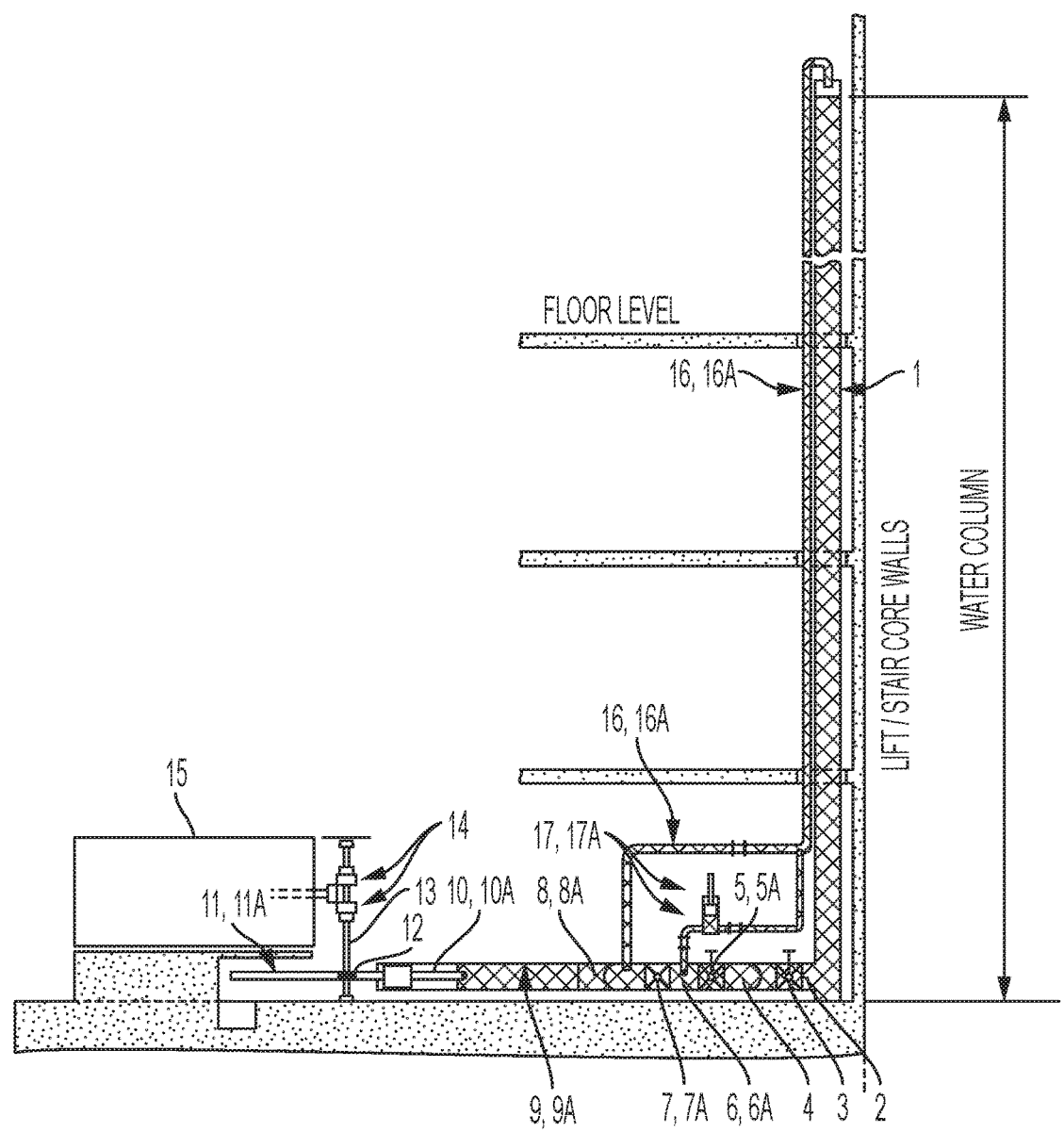
FIG. 1 shows a side elevation view of a hydrostatic pressure to kinetic energy conversion system in accordance with an embodiment.

The water column 1 is preferably a cylindrical shape and may be open at an upper end thereof. The water column 1 may be several stories high as shown in FIG. 1. For example, the water column 1 may be in excess of 12 m high.

The column 1 may be replenished by a water supply (not shown) which pours or pumps water into an upper end thereof. Alternatively, pump assisted risers 16 (as will be described in further detail below) may return water to the water column 1.

Figure 2:
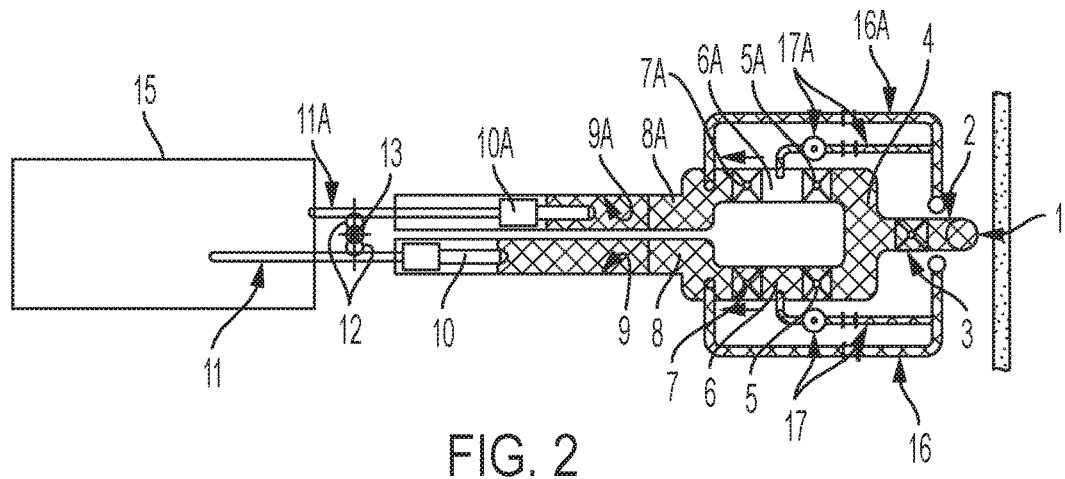
FIG. 2 shows a top plan view of the system of FIG. 1.
Figure 3:
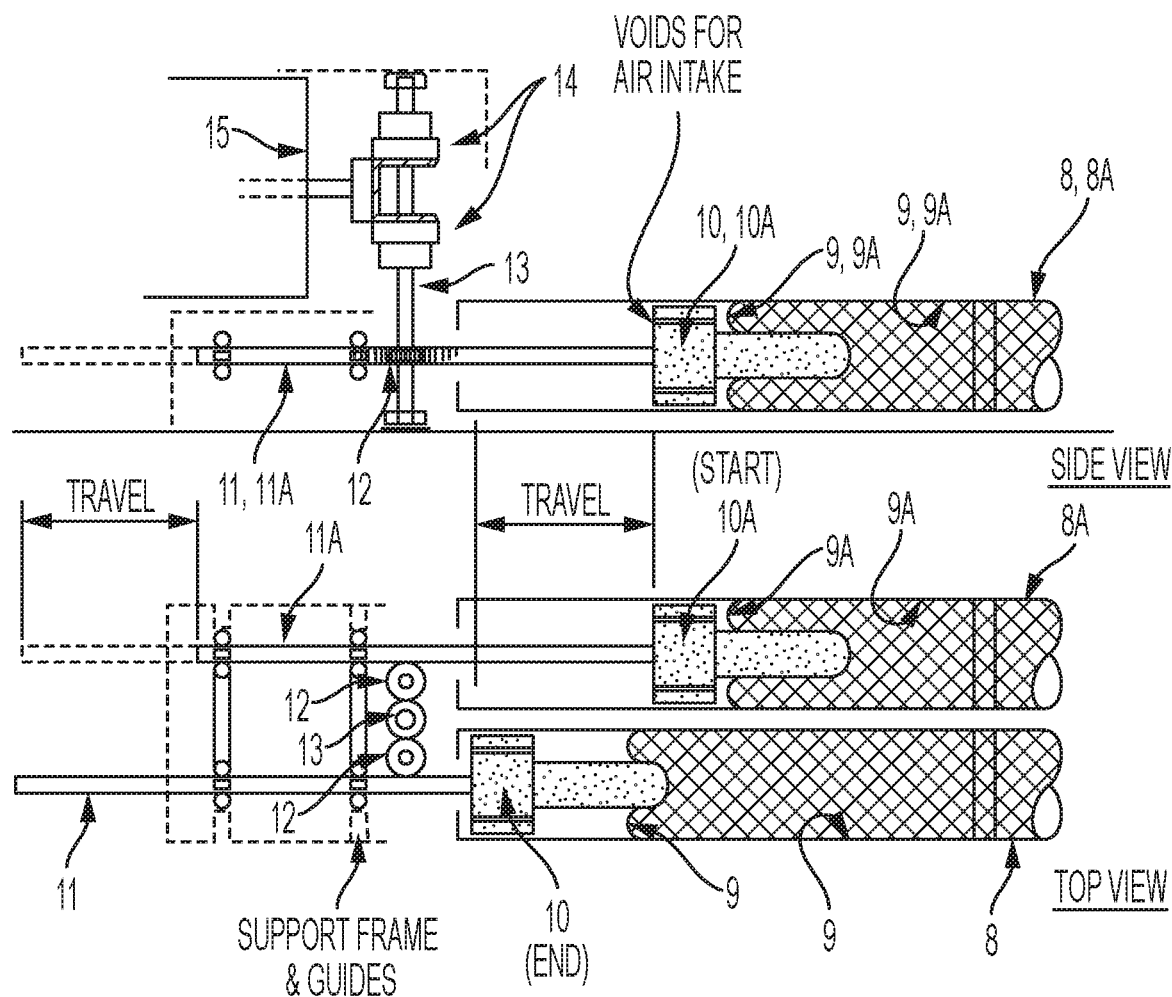
FIG. 3 illustrates pistons and interfacing gearing of the system of FIGS. 1 and 2 in further detail in accordance with an embodiment.

A lower end of the water column 1 diverges into a pair of pressure channels as best seen in FIG. 2.

An elbow 2 may take off horizontally from a lower end of the water column 1 and interface a maintenance shut-off valve 3

A T-section 4 may divert from the maintenance shut-off valve 3. Ends of the T-section 4 may form a start of each respective pressure channel.

A valve system interfaces the water column 1 and the pressure channels so that hydrostatic pressure from the water column 1 alternately pressurises each channel.

The channels may comprise alternately acting control valves 5 and 5A and nonreturn valves 7 and 7A downstream thereof.

Specifically, each end of the T-section 4 may interface a respective control valve 5, 5A which interfaces a respective short midsection 6, 6A which interfaces a respective non-return valves 7, 7A.

Figure 5:
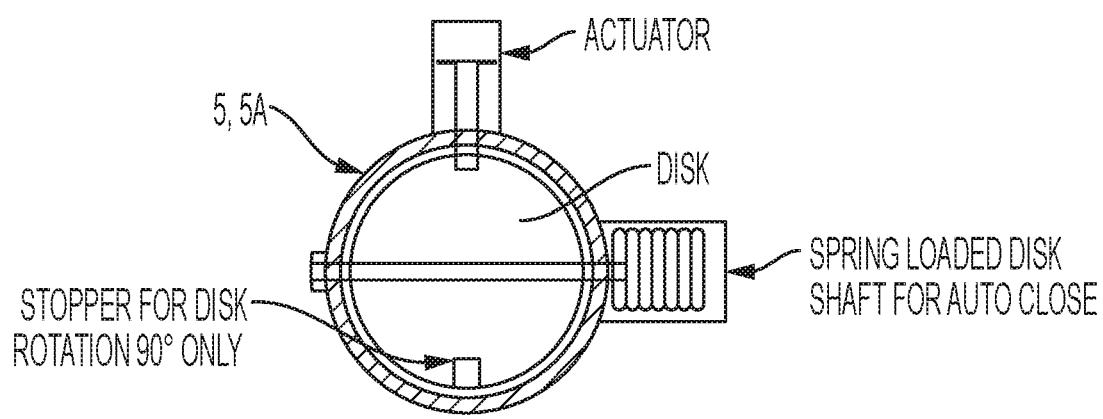
FIG. 5 shows a control valve in accordance with an embodiment.

FIG. 5 shows a modified butterfly-type control valve in accordance with an embodiment comprising a disc pivoting between open and closed positions. The control valve may be assisted by a spring-loaded disc shaft.

Figure 6:
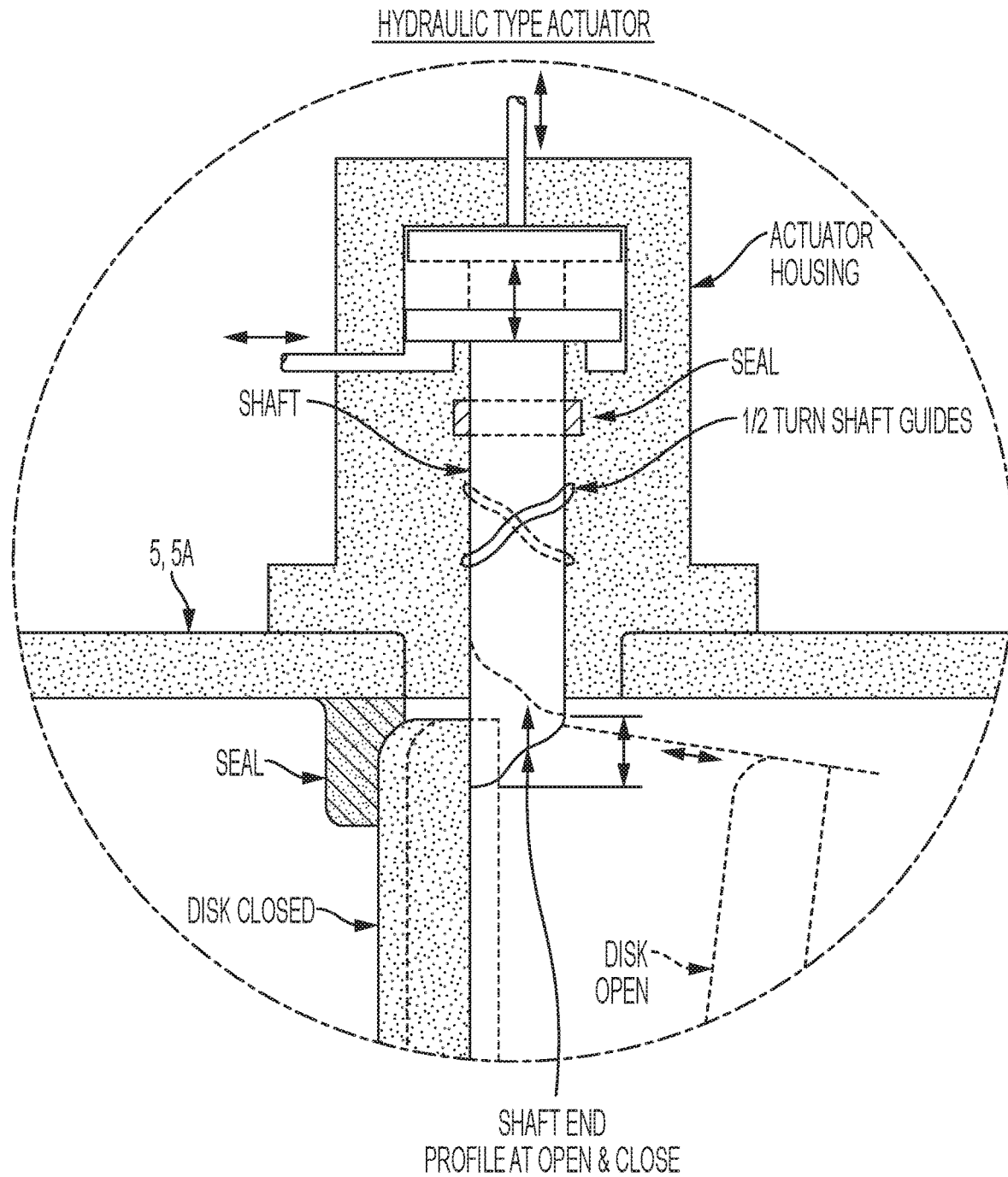
FIG. 6 shows a control valve actuator in accordance with an embodiment.

FIG. 6 shows a hydraulic disc actuator comprising a hydraulically operated piston having a distal end which extends to entrap the disc in a closed position and retract to allow the disc to open.

When a head of the piston is pressurised underneath, the piston moves upward, thereby freeing the disc to move to the open position.

The distal end of the piston may be angled to allow the disc to displace the piston when closing.

Each pressure channel may transition via Z sections 8, 8A to long parallel channels which retain pistons 10,10A and bladders 9,9A.

Furling bladders 9, 9A within the channels forcibly unfurl under pressure to force the pistons 10,10A.

The bladders 9, 9A may comprise a high tensile waterproof material connected to the inner walls of channels 8,8A to retain the hydrostatic pressure.

Racks 11, 11A are forced by the pistons 10,10A to act oppositely to rotate a driveshaft 13 therebetween Channel section 2, 4, 6, 6A, 8, and 8A preferably each comprises the same cross-sectional area as that of the column 1. Similarly control valves 5, 5A, nonreturn valves 7, 7A and shut-off valve 3 may comprises a similar cross section as that of the water column 1.

Each piston 10, 10A may comprise a large cross-section section and a smaller cross-section section. As shown in FIG. 2, the smaller cross-section sections may form a proximal ends the pistons 10, 10A which interface the bladders 9, 9A.

The proximal ends of the pistons 10, 10A preferably have an outer diameter substantially smaller than an inner diameter of each channel so that the bladders 9, 9A can furl around the proximal ends.

Furthermore, outer diameters of the large cross-section sections of the pistons 10A preferably match inner diameters of the channels to slidably restrain the pistons 10, 10A along the channels. The outer diameter of the large cross-section sections of the pistons 10, 10A may be configured to allow tolerance between the large cross-section sections and the inner diameter of the channels to reduce friction. Alternatively, the pistons 10, 10A can slide on a frictionless guide rail track assembly.

The racks 11,11A may act on pinions 12 which in turn rotate driveshaft 13 alternately in opposite directions. The coupling of the pinions 12 and the oscillating driveshaft 13 cause one piston 10 to retract as the other 10A extends. As the pistons reciprocate alternatively, the oscillating driveshaft 13 rotates alternately.

With reference to FIG. 1, system may further comprise a generator 15 driven by a generator driveshaft. A ratchet-type clutch or gearing mechanical coupling 14 may interface the alternately rotating driveshaft 13 to the generator driveshaft to convert alternating rotation of the driveshaft 13 to unidirectional rotation of the generator driveshaft.

Alternatively, the racks 11,11A drive a piston-type compressor directly to compress air which may be stored to run a generator.

The system may comprise return risers 16, 16A from sections 8, 8A to the upper open end of the column 1.

A pump may pump water via the risers 16, 16A. In embodiments, water draining from the pressure channels may be pooled in a reservoir awaiting off-peak period return pumping via the return risers 16, 16A. For example, water may drain from the water column 1 during periods of peak demand whereas pumps return water from the reservoir via the return risers 16, 16A during off-peak demand periods.

Each riser 16, 16A may comprise a nonreturn valve installed therein to prevent water flowing back to the respective channel. Pressure within sections 8, 8A assists water to return to the column 1 via the risers 16, 16A to the level of water within the column 1.

The risers 16, 16A may have substantially smaller cross-section than that of the respective channels.

The system may further comprise a siphon between the control valves 5, 5A and the nonreturn valve 7, 7A to prime the channels by reducing pressure between the control valves 5, 5A and the nonreturn valves 7, 7A to assist closing of the nonreturn valves 7, 7A.

The siphon may comprise a piston pump which pumps water via respective siphon riser 16, 16A.

Figure 4:
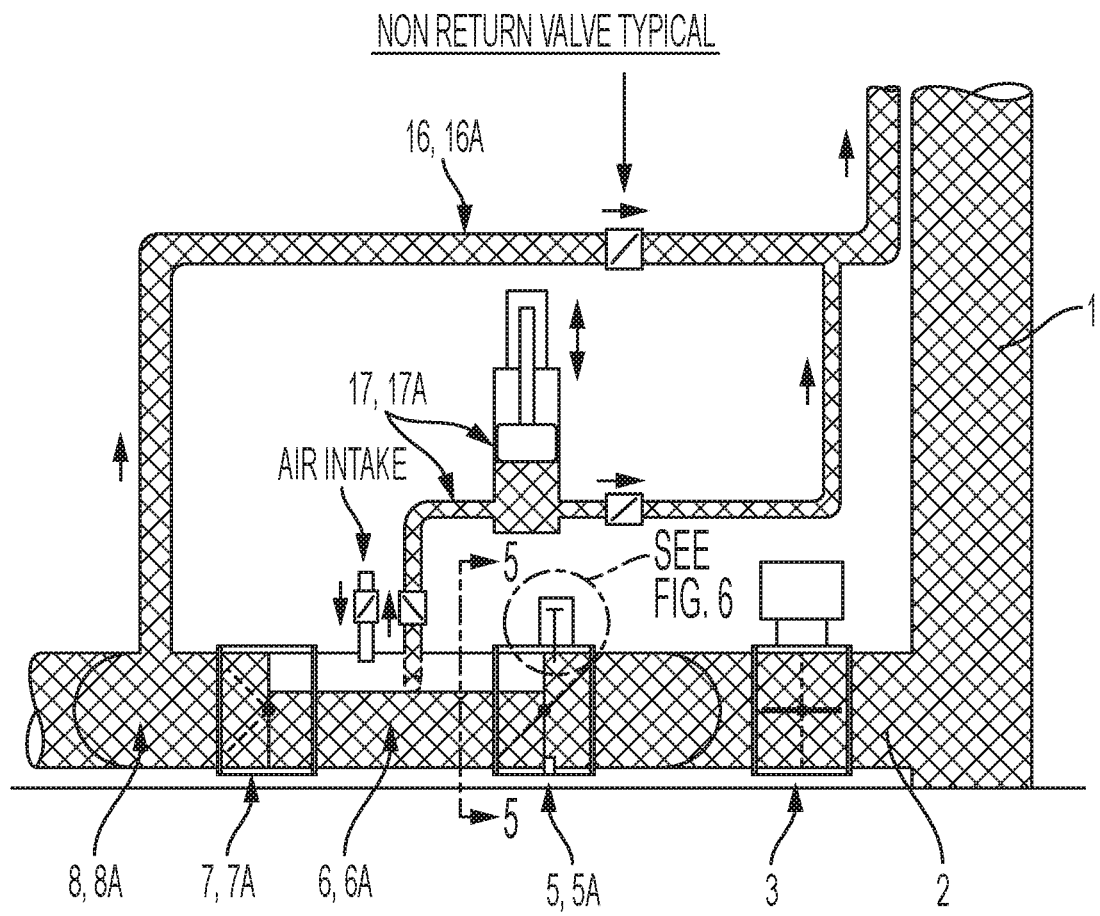
FIG. 4 illustrates return risers and piston pump siphons of the system of FIG. 1 in accordance with an embodiment.

Each siphon riser 17, 17A may comprise a pair of nonreturn valves either side of the piston pump. The piston assisted siphon risers 17, 17A may have smaller cross-section than that of the risers 16, 16A. As shown in FIG. 4, the midsection 6, 6A may comprise an air intake nonreturn valve to reduce suction within the midsection to allow in air as the piston pumps operate.

For operation, water column 1 is filled with water. Preferably, the water level is continuously replenished so that hydrostatic pressure at the bottom of the water column 1 remains constant.

Before a first stroke, with reference to FIG. 2 piston 10 is extended and piston 10A is retracted, valves 5A, 7A are closed and control valves 5,7 are open.

The piston pump 17A is pumped, to reduce pressure in midsection 6A, to force nonreturn valve 7A shut.

Then during operation, for the first stroke, control valve 5 is closed and piston pump 17 is pumped to reduce pressure in midsection 6 to force non return valve 7 shut. Control valve 5A is then opened.

Hydrostatic pressure in bladder 9A forces piston 10A to extend. The pinions 12 and shaft 13 act oppositely on piston 10 to retract and cause the shaft 13 to rotate in a first direction.

For a second stroke, control valve 5A is closed and piston pump 17A is pumped to reduce pressure in midsection 6A to force nonreturn valve 7A shut.

Control valve 5 is then opened.

Hydrostatic pressure in bladder 9 forces piston 10 to extend. The pinions 12 and shaft 13 act oppositely on piston 10A to retract and cause the shaft 13 to rotate in a first direction.

The foregoing description, for purposes of explanation, used specific nomenclature to provide a thorough understanding of the invention. However, it will be apparent to one skilled in the art that specific details are not required in order to practise the invention. Thus, the foregoing descriptions of specific embodiments of the invention are presented for purposes of illustration and description. They are not intended to be exhaustive or to limit the invention to the precise forms disclosed as obviously many modifications and variations are possible in view of the above teachings. The embodiments were chosen and described in order to best explain the principles of the invention and its practical applications, thereby enabling others skilled in the art to best utilize the invention and various embodiments with various modifications as are suited to the particular use contemplated. It is intended that the following claims and their equivalents define the scope of the invention.

The invention claimed is:

1. A method of operation of a hydrostatic pressure to kinetic energy conversion system, wherein the hydrostatic pressure to kinetic energy conversion system includes:
   a hydraulic head water column;
   a lower end of the water column diverging to a pair of pressure channels;
   a valve system interfacing the water column and the pair of pressure channels so that hydrostatic pressure from the water column alternately pressurizes each pressure channel of the pair of pressure channels;
   pistons;
   racks forced by the pistons to act oppositely to rotate a driveshaft therebetween in alternating opposite directions of rotation; and
   furling bladders within the pair of pressure channels which forcibly unfurl under the hydrostatic pressure to force the pistons, wherein:
   for a first stroke, valves, of the valve system, of a first channel of the pair of pressure channels are open and valves, of the valve system, of a second channel of the pair of pressure channels are closed so that the hydrostatic pressure causes a first bladder, of the furling bladders, in the first channel to unfurl to force a first piston of the pistons;
   each channel of the pair of pressure channels comprises a control valve and a nonreturn valve; the nonreturn valve is downstream from the control valve; and the conversion system further includes a siphon between the control valve and the nonreturn valve; and
   the siphon is operated to reduce the hydrostatic pressure between the control valve and the nonreturn valve to assist closing of the nonreturn valve.

2. The method as claimed in claim 1, wherein the furling bladders comprise high tensile waterproof material.

3. The method as claimed in claim 1, wherein the pair of pressure channels are horizontal.

4. The method as claimed in claim 1, wherein each channel of the pair of pressure channels has substantially the same cross section as the water column.

5. The method as claimed in claim 1, wherein the hydrostatic pressure to kinetic energy conversion system further comprises a maintenance shut-off valve between the lower end of the water column and the pair of pressure channels.

6. The method as claimed in claim 1, wherein the pistons comprise proximal ends acted on by the furling bladders and wherein each proximal end has an outer diameter substantially smaller than an inner diameter of a respective channel of the pair of pressure channels so each respective bladder of the furling bladders can envelop each respective proximal end of the proximal ends.

7. The method as claimed in claim 6, wherein the pistons each further comprise a section having an outer diameter suited to the inner diameter of the respective channel of the pair of pressure channels for slidable retention there along.

8. The method as claimed in claim 1, wherein the racks are coupled so as to force each other in an opposite direction.

9. The method as claimed in claim 1, wherein the racks turn respective pinions which rotatably engage the driveshaft therebetween.

10. The method as claimed in claim 1, wherein the hydrostatic pressure to kinetic energy conversion system further comprises a mechanical coupling between the driveshaft and a generator driveshaft to convert alternating rotation of the driveshaft to unidirectional rotation of the generator driveshaft.

11. The method as claimed in claim 10, wherein the generator driveshaft interfaces a generator.

12. The method as claimed in claim 1, wherein the hydrostatic pressure to kinetic energy conversion system further comprises return risers for returning water from the pair of pressure channels to the water column.

13. The method as claimed in claim 12, wherein the hydrostatic pressure to kinetic energy conversion system further comprises nonreturn valves interfacing the risers.

14. The method as claimed in claim 12, wherein the hydrostatic pressure to kinetic energy conversion system further comprises a pump assisting the returning water via the risers.

15. The method as claimed in claim 14, wherein the hydrostatic pressure to kinetic energy conversion system further comprises a storage reservoir interfacing the pair of pressure channels and the risers.

16. The method as claimed in claim 15, wherein the pump pumps the water from the storage reservoir during off-peak periods.

17. The method as claimed in claim 1 wherein the nonreturn valve comprises a double disk check valve.

18. The method as claimed in claim 1, wherein the control valve comprises a butterfly disc pivoting between open and closed positions.

19. The method as claimed in claim 18, wherein the hydrostatic pressure to kinetic energy conversion system further comprises an actuator comprising a hydraulically operated control piston having a distal end which extends to entrap the disc in the closed position.

20. The method as claimed in claim 19, wherein the distal end of the control piston is angled to allow the disc to displace from the open position when closing.

21. The method as claimed in claim 1, wherein the siphon is piston operated.

22. The method as claimed in claim 1, wherein the siphon returns water to the water column.

23. The method of operation of the hydrostatic pressure to kinetic energy conversion system as claimed in claim 1, wherein a second piston of the pistons is returned by a coupling between the racks, and wherein the racks are coupled by the coupling so as to force each other in an opposite direction.

* * * * *